(12) United States Patent
Abram et al.

(10) Patent No.: US 8,453,672 B2
(45) Date of Patent: Jun. 4, 2013

(54) PASSIVE VALVE FOR ATTENUATION OF LOW FREQUENCY NOISE

(75) Inventors: Kwin Abram, Columbus, IN (US); Joseph Callahan, Greenwood, IN (US); Robin Willats, Columbus, IN (US); Ivan Arbuckle, Columbus, IN (US)

(73) Assignee: Emcon Technologies LLC, Wilmington, DE (US)

( * ) Notice: Subject to any disclaimer, the term of this patent is extended or adjusted under 35 U.S.C. 154(b) by 610 days.

(21) Appl. No.: 11/950,034

(22) Filed: Dec. 4, 2007

(65) Prior Publication Data

US 2008/0236680 A1   Oct. 2, 2008

Related U.S. Application Data

(63) Continuation-in-part of application No. 11/692,964, filed on Mar. 29, 2007.

(60) Provisional application No. 60/989,508, filed on Nov. 21, 2007.

(51) Int. Cl.
*F16K 17/04* (2006.01)

(52) U.S. Cl.
USPC .......................... 137/527; 137/527.2; 251/303

(58) Field of Classification Search
USPC ........... 137/527, 527.2, 527.6, 527.8, 601.17, 137/582, 571, 254, 514; 181/237, 238, 254, 181/255, 227; 251/305, 304, 303; 60/312, 60/324, 725; 123/90.11
See application file for complete search history.

(56) References Cited

U.S. PATENT DOCUMENTS

| | | | |
|---|---|---|---|
| 1,330,265 A * | 2/1920 | Hinton | 137/527 |
| 1,375,621 A | 4/1921 | Wright, Jr. | |
| 1,635,842 A * | 7/1927 | Hirshstein | 137/527.2 |
| 1,666,005 A * | 4/1928 | Culp | 181/265 |
| 2,492,784 A * | 12/1949 | Christman | 181/236 |
| 2,766,768 A * | 10/1956 | Brown et al. | 137/312 |
| 2,895,562 A * | 7/1959 | Perry | 181/283 |
| 2,947,392 A * | 8/1960 | Heine | 477/188 |
| 3,234,924 A | 2/1966 | May | |
| 3,300,137 A | 1/1967 | Murphy | |
| 3,897,852 A * | 8/1975 | Hoffman et al. | 181/237 |
| 4,586,534 A * | 5/1986 | McNeely | 137/515.7 |
| 4,699,244 A | 10/1987 | Bergquist et al. | |
| 5,305,787 A * | 4/1994 | Thygesen | 137/527 |
| 5,355,673 A | 10/1994 | Sterling et al. | |
| 5,709,241 A * | 1/1998 | Iwata | 137/527.6 |
| 5,744,762 A * | 4/1998 | Seki et al. | 181/254 |
| 6,123,318 A * | 9/2000 | Forbes et al. | 251/173 |
| 6,425,412 B2 * | 7/2002 | Sterling | 137/527 |

(Continued)

*Primary Examiner* — Kevin Lee
*Assistant Examiner* — Macade Brown
(74) *Attorney, Agent, or Firm* — Carlson Gaskey Olds

(57) ABSTRACT

A passive valve assembly for an exhaust system is mounted within an exhaust tube. The exhaust tube has a bore that defines an exhaust flow path having a cross-sectional area. One end of the exhaust tube is to be connected to a first exhaust component and a second end of the exhaust tube is to be connected to a second exhaust component such that the exhaust tube forms a sole exhaust path between the first and the second exhaust components. The passive valve assembly includes a vane that is mounted within the bore, and which is moveable between an open position and a closed position. A resilient member biases the vane toward the closed position. When the vane is in the closed position, the vane covers 80% to 97% of the cross-sectional area.

26 Claims, 2 Drawing Sheets

U.S. PATENT DOCUMENTS

| | | | |
|---|---|---|---|
| 6,454,047 B1 * | 9/2002 | Galaitsis | 181/254 |
| 6,633,646 B1 * | 10/2003 | Hwang | 381/71.5 |
| 6,637,449 B2 * | 10/2003 | Nagai et al. | 137/15.18 |
| 6,854,709 B2 * | 2/2005 | Kawai et al. | 251/288 |
| 7,040,451 B2 * | 5/2006 | Schumacher et al. | 181/254 |
| 7,451,854 B2 * | 11/2008 | Suzuki et al. | 181/237 |
| 2005/0189166 A1 * | 9/2005 | Kikuchi et al. | 181/237 |
| 2008/0083218 A1 * | 4/2008 | Abram et al. | 60/324 |

* cited by examiner

PASSIVE VALVE FOR ATTENUATION OF LOW FREQUENCY NOISE

RELATED APPLICATIONS

This application is a continuation-in-part of application Ser. No. 11/692,964 filed on Mar. 29, 2007 and claims priority to provisional application No. 60/989,508 filed on Nov. 21, 2007.

TECHNICAL FIELD

The subject invention relates to a passive valve in a vehicle exhaust system, and more particularly relates to a passive valve in a non-bypass configuration with a high percentage of coverage when in a closed position.

BACKGROUND OF THE INVENTION

Exhaust systems are widely known and used with combustion engines. Typically, an exhaust system includes exhaust tubes that convey hot exhaust gases from the engine to other exhaust system components, such as mufflers, resonators, etc. A muffler includes acoustic chambers that cancel out sound waves carried by the exhaust gases. Although effective, mufflers are often relatively large in size and provide limited nose attenuation.

It has been proposed to include a valve in the muffler to provide further noise attenuation. However, the proposed valves have numerous drawbacks that limit their widespread use in a variety of applications.

As known, the muffler is subjected to different operating conditions dependent upon application. For example, due to its usual position, a main muffler for a passenger car can be subjected to exhaust gases of 600 degrees Celsius, while mufflers used in truck, minivan or SUV applications are subjected to gas temperatures that can exceed 750 degree Celsius.

In passenger car applications, a passive noise attenuation valve has been directly incorporated within a muffler body to provide noise attenuation. This valve includes a spring for biasing a valve body for pivotable movement within a valve housing that defines an exhaust flow path. The spring has limited application in high temperature environments. Special high-temperature spring materials are often required, which can be very expensive. Also, these valves can be difficult to package in smaller sized mufflers, which are typically used as part of a multi-muffler configuration for larger vehicles such as trucks, SUVs, mini-vans, etc.

The valve controls exhaust flow rate along the exhaust flow path. The valve body is moveable between a closed position, where 100% of the exhaust flow path is blocked by the valve body, and an open position where blocking of the exhaust flow path is minimized.

Further, these known passive valves are used in a configuration where a by-pass flow path is provided. In this type of configuration, there is a primary flow path and a by-pass flow path for exhaust gases. The valve body is positioned within an internal muffler tube that defines the primary flow path. As discussed above, the valve body is configured to block 100% of the primary flow path when in the closed position. A by-pass tube is in fluid communication with the internal muffler tube at a position upstream of the valve body and at a position downstream of the valve body. Under certain conditions, such as when the primary flow path is 100% blocked for example, exhaust gases are directed around the valve body via the by-pass tube.

Providing by-pass flow paths is disadvantageous from an assembly, material, and weight perspective. Further, as discussed above, it is difficult to package these valves in smaller mufflers, and these valves are not able to operate effectively in high temperature environments.

Additionally, these known passive valve configurations do not effectively attenuate low frequency noise. Attempts have been made to improve low frequency noise attenuation without using passive valves by either increasing muffler volume or increasing backpressure. Increasing muffler volume is disadvantageous from a cost, material, and packaging space perspective. Increasing backpressure can adversely affect engine power.

Attempts have also been made to use a non-bypass configuration with an actively controlled, vacuum operated valve configuration. However, this is disadvantageous from a cost and packaging perspective.

Therefore, there is a need for a more effective passive noise attenuation valve that operates efficiently within the exhaust flow, and which can attenuate low frequency noise. This invention addresses those needs while avoiding the shortcomings and drawbacks of the prior art.

SUMMARY OF THE INVENTION

A passive valve for a vehicle exhaust system is arranged in a non-bypass configuration and provides a high percentage of coverage when in a closed position.

In one example, the passive valve assembly is mounted within an exhaust tube. The exhaust tube has a bore that defines an exhaust flow path having a cross-sectional area. One end of the exhaust tube is to be connected to a first exhaust component and a second end of the exhaust tube is to be connected to a second exhaust component such that the exhaust tube forms a sole exhaust path between the first and the second exhaust components. The passive valve assembly includes a vane that is mounted within the bore, and which is moveable between an open position and a closed position. A resilient member biases the vane toward the closed position. When the vane is in the closed position, the vane covers 80-97% of the cross-sectional area.

As such, a high-coverage single passive valve assembly is used in a non-bypass arrangement to effectively attenuate low frequency noise. These and other features of the present invention can be best understood from the following specification and drawings, the following of which is a brief description.

DETAILED DESCRIPTION OF THE PREFERRED EMBODIMENT

Figure 1:
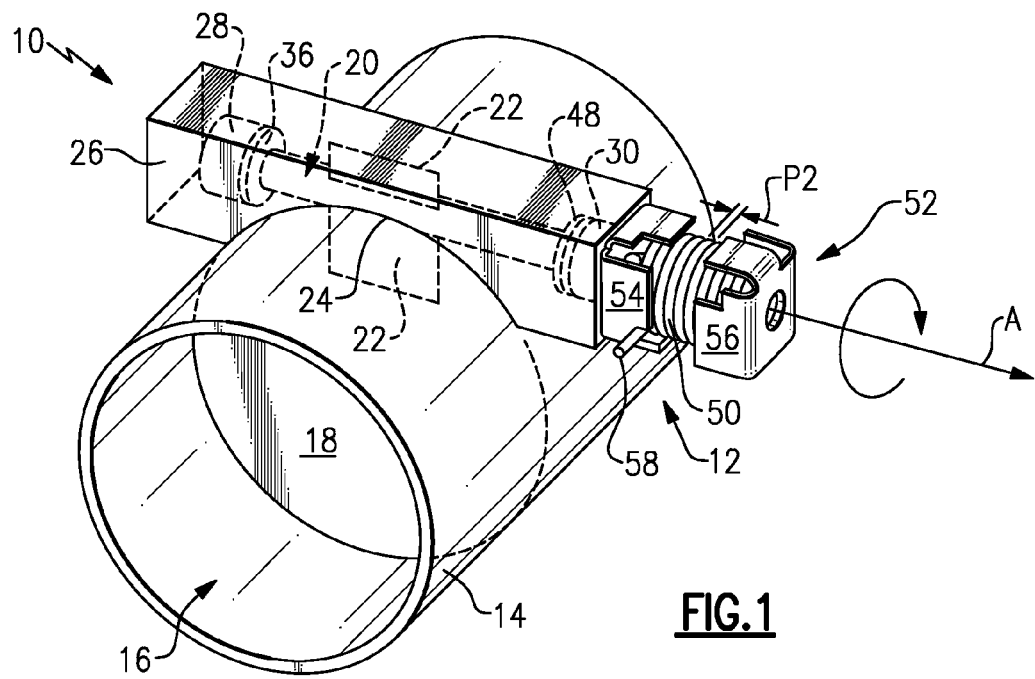
FIG. 1 shows a perspective view of an exhaust component and exhaust valve assembly incorporating the subject invention.

An exhaust component 10 (FIG. 1) includes an exhaust valve, referred to as a passive valve assembly 12, which is movable between an open position and a closed position. In the example shown, the exhaust component 10 comprises a tube body 14 that defines an exhaust gas flow path 16 having a specified cross-sectional area. The passive valve assembly 12 includes a valve body or vane 18 that blocks a portion of the exhaust gas flow path 16 when in the closed position. The vane 18 is pivoted toward the open position to minimize blockage of the exhaust gas flow path 16 in response to pressure exerted against the vane 18 by exhaust gases.

In one example the vane 18 is fixed to a shaft 20 with a tang or bracket 22. A slot 24 is formed within an outer surface of the tube body 14. A housing 26, shown in this example as a square metal structure, is received within this slot 24 and is welded to the tube body 14. Other housing configurations could also be used. The shaft 20 is rotatably supported within the housing 26 by first 28 and second 30 bushings or bearings. In the example shown, the bracket 22 comprises a piece of sheet metal that has one portion welded to the shaft 20 and another portion that extends outwardly from the housing 26 and is welded to the vane 18. Thus, the vane 18 and the shaft 20 pivot together about an axis A that is defined by the shaft 20. The bracket 22 is just one example of how the shaft 20 can be attached to the vane 18, it should be understood that other attachment mechanisms could also be used.

Figure 2:
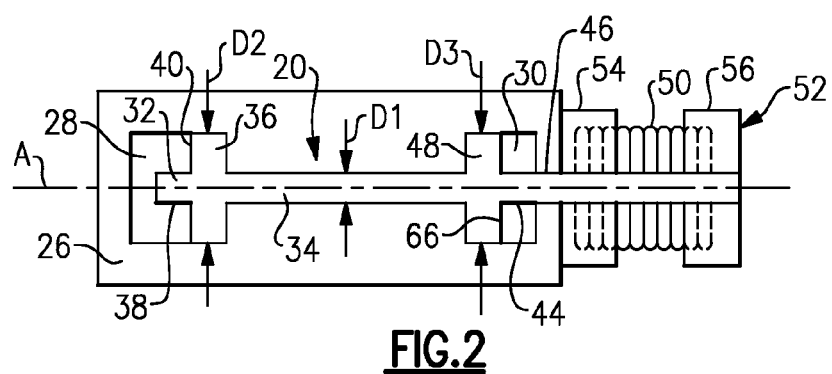
FIG. 2 shows a schematic view of a valve shaft, bushings, and spring as used in the assembly of FIG. 1.

The first bushing 28 is positioned generally at a first shaft end 32. As shown in FIG. 2, the first bushing 28 comprises a sealed interface for the first shaft end 32. The shaft 20 includes a shaft body 34 that is defined by a first diameter D1. Near the first shaft end 32 is a first collar 36 that is defined by a second diameter D2 that is greater than the first diameter D1. The first bushing 28 includes a first bore 38 that receives the first shaft end 32. The first collar 36 abuts directly against an end face 40 of the first bushing 28 such that exhaust gas cannot leak out of the first bushing 28 along a path between the shaft 20 and first bushing 28.

The second bushing 30 includes a second bore 44 through which the shaft body 34 extends to a second shaft end 46. The shaft 20 includes a second collar 48 that is defined by a third diameter D3 that is greater than the first diameter D1. The second D2 and third D3 diameters can be the same or different from each other. The second collar 48 is located axially inboard of the second bushing 30.

The shaft 20 extends through the second bore 44 to an axially outboard position relative to the second bushing 30. A resilient member, such as a spring 50 for example, is coupled to the second shaft end 46 with a spring retainer 52. The spring retainer 52 includes a first retainer piece 54 that is fixed to the housing 26 and a second retainer piece 56 that is fixed to the second shaft end 46. One spring end 58 is associated with housing via the first retainer piece 54 and a second spring end 60 (FIG. 3) is associated with the shaft 20 via the second retainer piece 56. Advantageously, the spring 50 is located external to, i.e. outside of, the tube body 14. As such, the spring 50 operates in a much cooler environment instead of being subjected directly to the high temperature exhaust gases as in prior designs.

In one example, the spring 50 comprises a coil spring that is configured to be compressed both in an axial direction along axis A and in a torsional direction about the axis A during installation. Torsional loading creates a preload force that biases the shaft 20 and the vane 18 toward the closed position. As gas flow increases, this torsional force is overcome to move the vane 18 toward the open position. The axial force serves to positively seat and seal the second collar 48 against an end face 66 of the second bushing 30. This prevents any exhaust gas from leaking out of the second bushing 30 by sealing off a passage between an outer surface of the shaft 20 and a bore surface of the second bushing 30. Thus, a single spring is used to provide both axial and torsional loading, resulting in a configuration that can both hold the passive valve assembly 12 in a desired operational position as well as preventing exhaust gas leakage.

Figure 3:
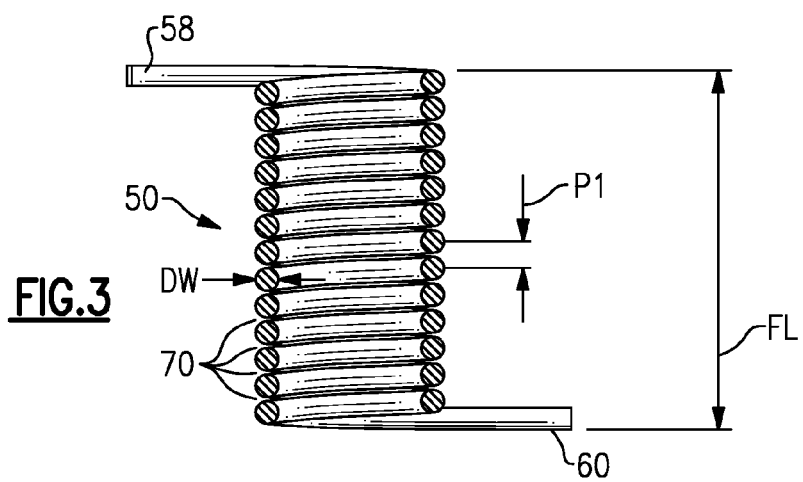
FIG. 3 shows a cross-sectional view of the spring of FIG. 2.

The spring 50 is shown in greater detail in FIG. 3. The spring 50 is a coil spring formed from wire having a diameter Dw. Prior to installation, the spring 50 is defined by a free length condition FL where a first pitch dimension P1 is greater than the diameter Dw. This relationship results in spacing between adjacent coils by a gap 70. The gaps 70 between adjacent coils enable the spring 50 to be compressed in the axial direction as well as in the torsional direction during installation. This results in a second pitch dimension P2 (FIG. 1) that is less than the first pitch dimension P1.

In one example configuration, the spring 50 has a wire diameter Dw that is approximately 1.8 mm, and a first pitch dimension P1 that is greater than 2 mm. The spring 50 also has an overall outer diameter of 17 mm and a free length FL of approximately 30 mm. When compressed for installation this free length FL is reduced by approximately 5 mm. It should be understood that this is just one example configuration and that other configurations could be used as needed to provide desired characteristics.

By utilizing a single spring that can act both in torsion and axially, the shaft can be loaded against the bushing, which will minimize exhaust gas leakage between the shaft and the bushing. Further, this configuration can be used to minimize build up variations because the shaft will always be positively located against the bushing.

The passive valve assembly 12 also provides a significant amount of coverage of the exhaust gas flow path 16 when in the closed position as compared to prior valves, which have 50% or less coverage when closed. In the example shown in FIGS. 4-5, the passive valve assembly 12 is positioned in an exhaust tube 80 having a first tube end 82 that is connected to a first exhaust component 84 and a second tube end 86 that is connected to a second exhaust component 88. The first 84 and second 88 exhaust components can comprise components such as a muffler, tailpipe, etc.

Figure 6:
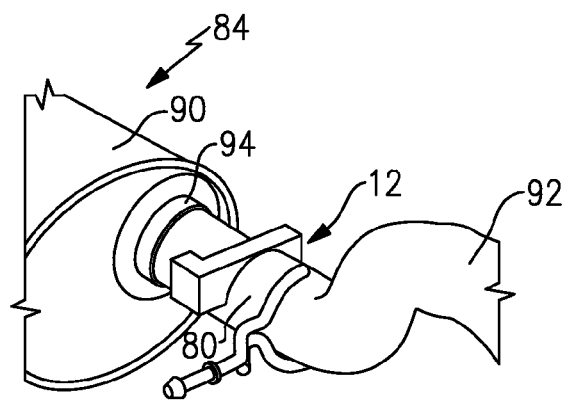
FIG. 6 is a perspective view of a muffler and an external exhaust tube with a passive valve assembly.

In one example, shown in FIG. 6, the first exhaust component 84 comprises a muffler 90 and the second exhaust component 88 comprises a tailpipe 92. The exhaust tube 80 is connected to an outlet 94 of the muffler 90 and an inlet to the tailpipe 92. In another example, both the first 82 and second 86 components comprise mufflers (schematically shown in FIG. 4) with the exhaust tube 80 being connected to an outlet from one muffler and to an inlet from another muffler.

In either configuration, the exhaust tube 80 has an internal bore or opening 98 that fluidly connects the first 84 and second 88 exhaust components and defines the exhaust gas flow path 16. The exhaust gas flow path 16 is sole flow path between the first 84 and second 88 exhaust components. In other words, there is no by-pass flow path associated with the exhaust tube 80 and the only path through which exhaust gases can flow is exhaust gas flow path 16 within the exhaust tube 80.

Figure 4:
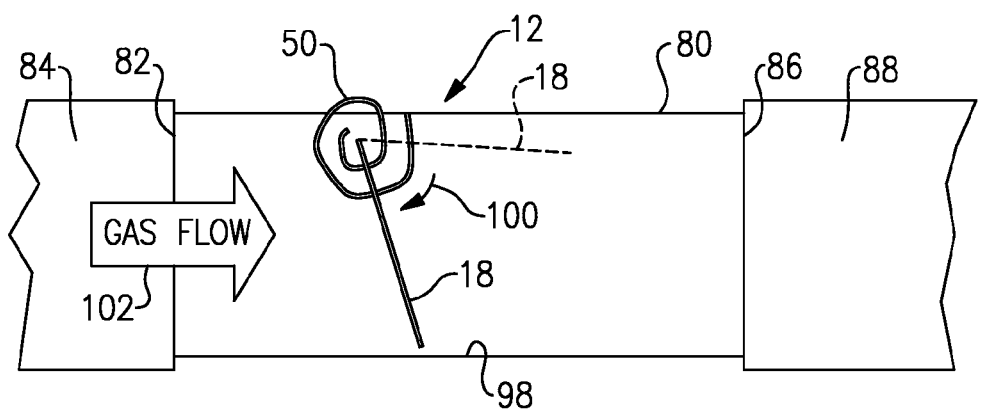
FIG. 4 is a schematic side view of a spring and vane showing substantially closed and open positions.
Figure 5:
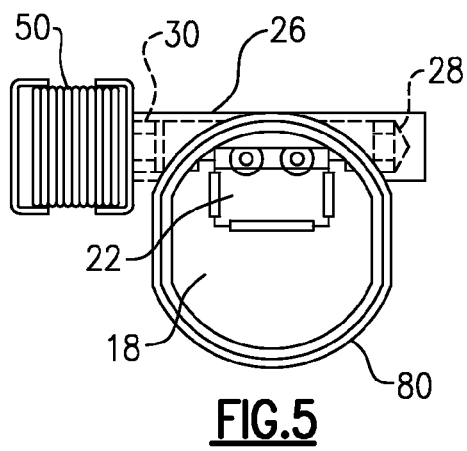
FIG. 5 is a cross-sectional end view of an external exhaust tube and passive valve assembly with the vane being in the substantially closed position.

As shown in FIG. 4, the vane 18 is pivotable within the opening 98 from a substantially closed position (solid line) to a substantially open position (dashed line). The vane 18 is biased by the spring 50 (shown schematically) toward the closed position as schematically indicated at 100. When exhaust gas pressure, indicated by arrow 102, exceeds a certain level, the spring force is overcome and the vane 18 is moved toward the open position.

The opening 98 is defined by a cross-sectional area. When the vane 18 is in the closed position, this cross-sectional area is covered, i.e. closed off, by approximately 80-97%. In one example, the cross-sectional area is covered within a range of 87.5-92.5%. Thus, only a very small part of the cross-sectional area is left open for exhaust gas flow when the vane 18 is in the closed position (see FIG. 5).

This high percentage of coverage, in combination with a non-bypass configuration, provides a very effective way to attenuate low frequency noise.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A passive valve assembly for an exhaust system comprising:
    an exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components;
    a vane mounted within said bore and being moveable between an open position and a closed position, said vane providing 80% to 97% coverage of said cross-sectional area when in said closed position, and wherein a length of said exhaust tube extending between said one end and said second end is greater than a diameter of said vane; and
    a resilient member that biases said vane toward said closed position, said vane solely being moveable from said closed position toward said open position in response to an increased pressure of exhaust gas flow that exceeds a biasing force of said resilient member.

2. The passive valve assembly according to claim 1 wherein said vane provides 87.5% to 92.5% coverage of said cross-sectional area when in said closed position.

3. The passive valve assembly according to claim 1 including a shaft mounted to said vane, said shaft being pivotally supported by at least one bushing, and wherein said resilient member comprises a spring that is supported on said shaft.

4. The passive valve assembly according to claim 1 wherein said cross-sectional area of said exhaust tube is generally constant along an axial length of said exhaust tube.

5. A passive valve assembly for an exhaust system comprising:
    an exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components, and wherein the exhaust tube comprises a single tube body having a first tube end connected to the first exhaust component and a second tube end connected to the second exhaust component such that the exhaust tube only extends between the first and second exhaust components;
    a vane mounted within said bore and being moveable between an open position and a closed position said vane providing 80% to 97% coverage of said cross-sectional area when in said closed position, and wherein said vane comprises the only valve assembly positioned between the first and the second exhaust components, and wherein the vane is positioned within the exhaust path such that the vane is axially spaced apart from the first and second tube ends and
    a resilient member that biases said vane toward said closed position, said vane solely being moveable from said closed position toward said open position in response to an increased pressure of exhaust gas flow that exceeds a biasing force of said resilient member.

6. A passive valve assembly for an exhaust system comprising:
    an exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components, and wherein at least one of the first and second exhaust components comprises a single muffler;
    a vane mounted within said bore and being moveable between an open position and a closed position, said vane providing 80% to 97% coverage of said cross-sectional area when in said dosed position; and
    a resilient member that biases said vane toward said closed position, said vane solely being moveable from said closed position toward said open position in response to an increased pressure of exhaust gas flow that exceeds a biasing force of said resilient member.

7. The passive valve assembly according to claim 6 wherein the other of the first and second exhaust components comprises one of a tailpipe and another single muffler.

8. A passive valve assembly for an exhaust system comprising:
    exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components;
    a vane mounted within said bore and being moveable between an open position and a closed position, said vane providing 80% to 97% coverage of said cross-sectional area when in said closed position;
    a resilient member that biases said vane toward said closed position, said vane solely being moveable from said closed position toward said open position in response to an increased pressure of exhaust gas flow that exceeds a biasing force of said resilient members and
    a shaft mounted to said vane, said shaft being pivotally supported by at least one bushing, and wherein said resilient member comprises a spring that is supported on said shaft, and wherein said exhaust tube includes a slot that receives a housing, said housing including a central bore that receives said at least one bushing and said shaft, and wherein said shaft extends between first and second shaft ends with said spring being supported on one of said first and said second shaft ends outside of said exhaust tube.

9. An exhaust system comprising:
    a first exhaust component;

a second exhaust component, wherein one of said first and second exhaust components comprises a muffler and the other of said first and second exhaust components comprises a tailpipe;

an exhaust tube including an internal opening defining an exhaust flow path that has a cross-sectional area, said exhaust tube having one tube end connected to said first exhaust component and a second tube end connected to said second exhaust component, said exhaust tube having only one inlet at said first tube end and only one outlet at said second tube end such that said exhaust tube forms a sole exhaust path extending between said first and said second exhaust components; and a passive valve assembly including a vane mounted within said internal opening, said vane being moveable between an open position and a closed position, and said vane providing 80% to 97% coverage of said cross-sectional area when in said closed position, and said vane solely being moveable from said closed position toward said open position in response to an increased pressure of exhaust gas flow, and wherein said vane is mounted within said exhaust tube at a location that is external to said muffler.

10. The exhaust system according to claim 9 including a resilient member that biases said vane toward said closed position, and wherein said vane is moved from said closed position toward said open position only when pressure of the exhaust gas flow exceeds a biasing force of said resilient member.

11. The exhaust system according to claim 10 wherein said vane provides 87.5% to 92.5% coverage of said cross-sectional area when in said closed position.

12. The exhaust system according to claim 10 including a housing with a central bore, first and second bushings mounted within said central bore, a shaft rotatably supported on said first and second bushings, a first retainer fixed to said housing, and a second retainer fixed to said shaft, and wherein said vane is fixed to said shaft for pivotable movement therewith between said open and said closed positions, and wherein said resilient member comprises a coil spring having a first spring end associated with said housing via said first retainer and a second spring end associated with said shaft via said second retainer such that said coil spring biases said vane toward said closed position.

13. An exhaust system comprising:
a first exhaust component;
a second exhaust component;
an exhaust tube including an internal opening defining an exhaust flow path that has a cross-sectional area, said exhaust tube having one tube end connected to said first exhaust component and a second tube end connected to said second exhaust component, said exhaust tube having only one inlet at said first tube end and only one outlet at said second tube end such that said exhaust tube forms a sole exhaust path extending between said first and said second exhaust components wherein the exhaust tube comprises a single tube body having a first tube end connected to the first exhaust component and a second tube end connected to the second exhaust component such that the exhaust tube only extends between the first and second exhaust components; and a passive valve assembly including a vane mounted within said internal opening, said vane being moveable between an open position and a closed position, and said vane providing 80% to 97% coverage of said cross-sectional area when in said closed position, and said vane solely being moveable from said closed position toward said open position in response to an increased pressure of exhaust gas flow, and wherein said vane comprises the only valve assembly positioned between said first and said second exhaust components, and wherein said vane is positioned within the exhaust path such that the vane is axially spaced apart from the first and second tube ends; and a resilient member that biases said vane toward said closed position, and wherein said vane is moved from said closed position toward said open position only when pressure of the exhaust gas flow exceeds a biasing force of said resilient member.

14. An exhaust system comprising:
a first exhaust component;
a second exhaust component wherein one of said first and said second exhaust components comprises a first single muffler and the other of said first and said second exhaust components comprises one of a tailpipe and a second single muffler;

an exhaust tube including an internal opening defining an exhaust flow path that has a cross-sectional area, said exhaust tube having one tube end connected to said first exhaust component and a second tube end connected to said second exhaust component, said exhaust tube having only one inlet at said first tube end and only one outlet at said second tube end such that said exhaust tube forms a sole exhaust path extending between said first and said second exhaust components, and wherein said inlet of said exhaust tube only receives exhaust gas from said first single muffler and wherein said outlet of said exhaust tube only directs exhaust gas flow into the other of said one of said tailpipe and said second single muffler;

a passive valve assembly including a vane mounted within said internal opening, said vane being moveable between an open position and a closed position, and said vane providing 80% to 97% coverage of said cross-sectional area when in said closed position, and said vane solely being moveable from said closed position toward said open position in response to an increased pressure of exhaust gas flow; and a resilient member that biases said vane toward said closed position, and wherein said vane is moved from said closed position toward said open position only when pressure of the exhaust gas flow exceeds a biasing force of said resilient member.

15. A passive valve assembly for an exhaust system comprising:
an exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components;

a vane mounted within said bore and being moveable between an open position and a closed position, said vane providing 80% to 97% coverage of said cross-sectional area when in said closed position;

a resilient member that biases said vane toward said closed position, said vane solely being moveable from said closed position toward said open position in response to an increased pressure of exhaust gas flow that exceeds a biasing force of said resilient member; and wherein said exhaust tube has a first tube end connected to the first exhaust component and a second tube end connected to the second exhaust component and wherein said vane is positioned within said exhaust tube to be external to the first and second exhaust components and wherein said exhaust tube is externally located to all other exhaust components.

16. The passive valve assembly according to claim 15 wherein the first exhaust component comprises a tailpipe and the second exhaust component comprises a muffler.

17. A passive valve assembly for an exhaust system comprising:
an exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components, and wherein said exhaust tube comprises a single tube that only extends between the first and second exhaust components such that said inlet of said exhaust tube only receives exhaust gas from one of the first and second exhaust components and said outlet of said exhaust tube only directs exhaust gas flow into the other of the first and second exhaust components;
a vane mounted within said bore and being moveable between an open position and a closed position, said vane providing 80% to 97% coverage of said cross-sectional area when in said closed position, and wherein said vane remains entirely within said exhaust tube as said vane moves between said open and closed positions and with said exhaust tube being externally located to all other exhaust components; and
a resilient member that biases said vane toward said closed position, said vane solely being moveable from said closed position toward said open position in response to an increased pressure of exhaust gas flow that exceeds a biasing force of said resilient member.

18. The passive valve assembly according to claim 17 wherein said resilient member is mounted external to said single tube.

19. An exhaust system comprising:
a first exhaust component;
a second exhaust component;
an exhaust tube including an internal opening defining an exhaust flow path that has a cross-sectional area, said exhaust tube having one tube end connected to said first exhaust component and a second tube end connected to said second exhaust component said exhaust tube having only one inlet at said first tube end and only one outlet at said second tube end such that said exhaust tube forms a sole exhaust path extending between said first and said second exhaust components;
a passive valve assembly including a vane mounted within said internal opening, said vane being moveable between an open position and a closed position, and said vane providing 80% to 97% coverage of said cross-sectional area when in said closed position, and said vane solely being moveable from said closed position toward said open position in response to an increased pressure of exhaust gas flow that overcomes a biasing force of a resilient member; and
wherein said exhaust tube comprises a single tube that connects said first and second exhaust components and wherein said resilient member is mounted external to said single tube, and wherein said vane remains entirely within said single tube as said vane moves between said open and closed positions.

20. An exhaust system comprising:
a first exhaust component;
a second exhaust component;
an exhaust tube including an internal opening defining an exhaust flow path that has a cross-sectional area, said exhaust tube having one tube end connected to said first exhaust component and a second tube end connected to said second exhaust component, said exhaust tube having only one inlet at said first tube end and only one outlet at said second tube end such that said exhaust tube forms a sole exhaust path extending between said first and said second exhaust components, and wherein said cross-sectional area of said exhaust tube is generally constant along an axial length of said exhaust tube, and wherein said exhaust tube has a first tube end connected to the first exhaust component and a second tube end connected to the second exhaust component; and
a passive valve assembly including a vane mounted within said internal opening, said vane being moveable between an open position and a closed position, and said vane providing 80% to 97% coverage of said cross-sectional area when in said closed position, and said vane solely being moveable from said closed position toward said open position in response to an increased pressure of exhaust gas flow, and wherein said vane is positioned within said exhaust tube to be external to the first and second exhaust components and with said exhaust tube being externally located to all other exhaust components.

21. A passive valve assembly for an exhaust system comprising:
an exhaust tube having only one inlet and only one outlet, said inlet to be only connected to a first single exhaust component and said outlet only to be connected to a second single exhaust component such that said exhaust tube forms a sole exhaust flow path extending between the first and the second exhaust components;
a vane mounted within said exhaust tube and being pivotable between an open position and a closed position, and wherein said sole exhaust flow path has a cross-sectional area, said vane providing 80% to 97% coverage of said cross-sectional area when in said closed position, and wherein a length of said exhaust tube extending between said inlet and said outlet is greater than a width of the vane extending across the cross-sectional area of the flow path such that said vane remains entirely within said exhaust tube as said vane moves between said open and closed positions; and
a resilient member that biases said vane toward said closed position, said vane solely being moveable from said closed position toward said open position in response to an increased pressure of exhaust gas flow.

22. The passive valve assembly according to claim 21 wherein said vane comprises a body having an upstream face and a downstream face, and wherein said body is defined by a thickness extending axially between said upstream and downstream faces with said width being defined as extending across said upstream face from one body edge to an opposite body edge.

23. An exhaust system comprising:
a first exhaust component;
a second exhaust component;
an exhaust tube including an internal opening defining an exhaust flow path that has a cross-sectional area, said exhaust tube having one tube end connected to said first exhaust component and a second tube end connected to said second exhaust component, said exhaust tube having only one inlet at said first tube end and only one outlet at said second tube end such that said exhaust tube forms a sole exhaust path extending between said first and said second exhaust components; and a passive valve assembly including a vane mounted within said internal opening, said vane being moveable between an open position and a closed position, and said vane providing 80% to 97% coverage of said cross-sectional area when in said closed position, and said vane solely being moveable from said closed position toward said open position in response to an increased pressure of exhaust gas flow, and wherein a length of said exhaust tube extending between said one tube end and said second tube end is greater than a diameter of the vane.

24. A passive valve assembly for an exhaust system comprising:

an exhaust tube having a bore defining an exhaust flow path having a cross-sectional area, said exhaust tube having one end to be connected to a first exhaust component and a second end to be connected to a second exhaust component, said exhaust tube having only one inlet and only one outlet such that said exhaust tube forms a sole exhaust path extending between the first and the second exhaust components;

a vane mounted within said bore and being moveable between an open position and a closed position, said vane providing 80% to 97% coverage of said cross-sectional area when in said closed position; and a resilient member that biases said vane toward said closed position, said vane solely being moveable from said closed position toward said open position in response to an increased pressure of exhaust gas flow that exceeds a biasing force of said resilient member, and wherein said vane is moveable between said open and closed positions during vehicle operation as exhaust gas flow pressures increase and decrease in relation to said biasing force of said resilient member, and wherein with said exhaust tube is externally located to all other exhaust components.

25. A passive valve assembly for an exhaust system comprising:

an exhaust tube having only one inlet and only one outlet, said inlet to be only connected to a first single exhaust component and said outlet only to be connected to a second single exhaust component such that said exhaust tube forms a sole exhaust flow path extending between the first and the second exhaust components wherein said inlet comprises a first tube end connected to the first exhaust component and said outlet comprises a second tube end connected to the second exhaust component;

a vane mounted within said exhaust tube and being pivotable between an open position and a closed position, and wherein said sole exhaust flow path has a cross-sectional area, said vane providing 80% to 97% coverage of said cross-sectional area when in said closed position, and wherein said vane is positioned within said exhaust tube to be external to the first and second exhaust components and is positioned within said exhaust flow path to be axially spaced apart from said first and second tube ends; and a resilient member that biases said vane toward said closed position, said vane solely being moveable from said closed position toward said open position in response to an increased pressure of exhaust gas flow.

26. The passive valve assembly according to claim 25 wherein said exhaust tube is externally located to all other exhaust components.

* * * * *